Nov. 24, 1936.   W. B. WHEELER   2,062,018
DIRIGIBLE AIRCRAFT PROPULSION AND CONTROL
Filed Jan. 30, 1935   2 Sheets-Sheet 1
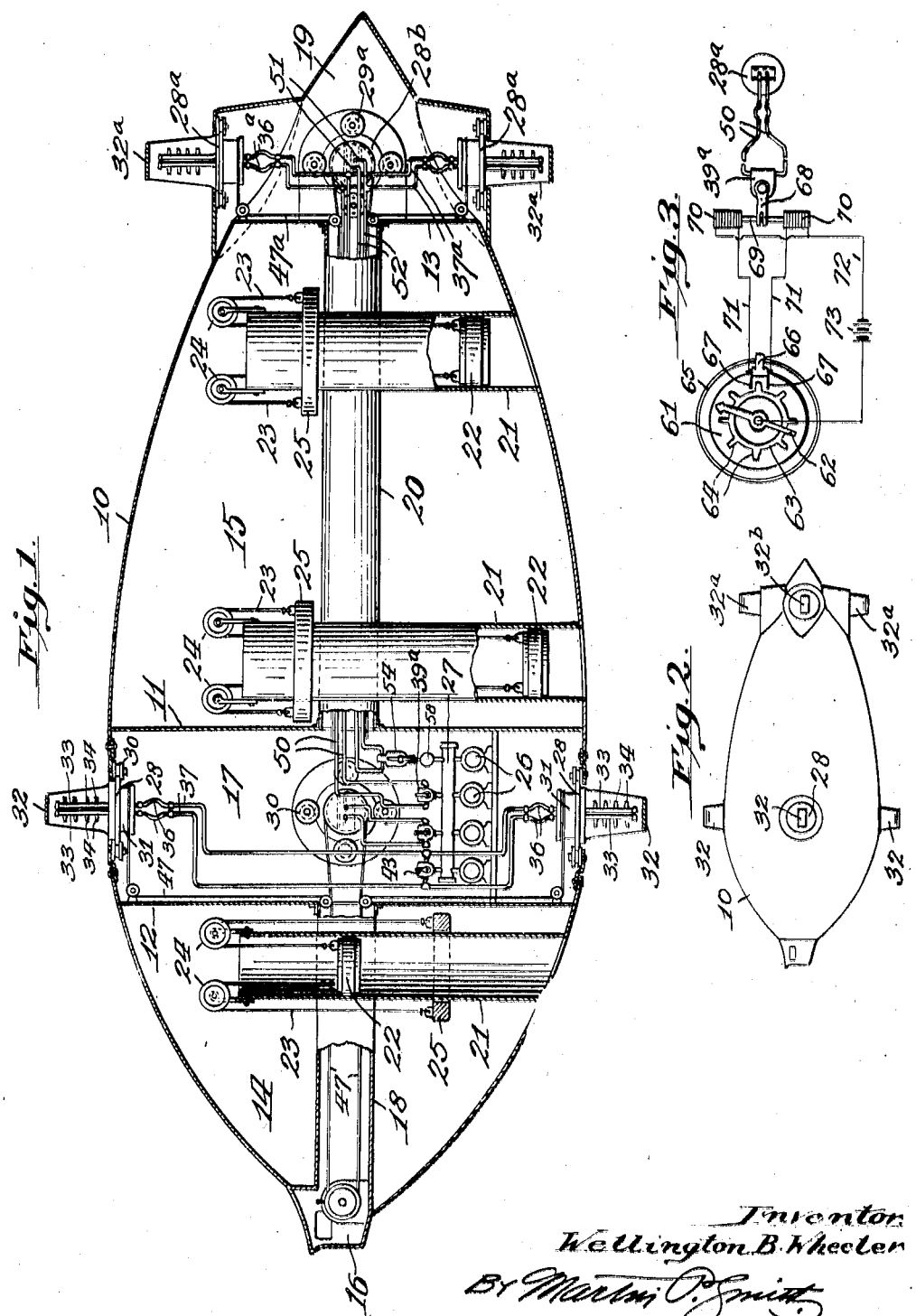
Inventor
Wellington B. Wheeler
By Martin P. Smith
Attorney.

Nov. 24, 1936. W. B. WHEELER 2,062,018
DIRIGIBLE AIRCRAFT PROPULSION AND CONTROL
Filed Jan. 30, 1935 2 Sheets-Sheet 2
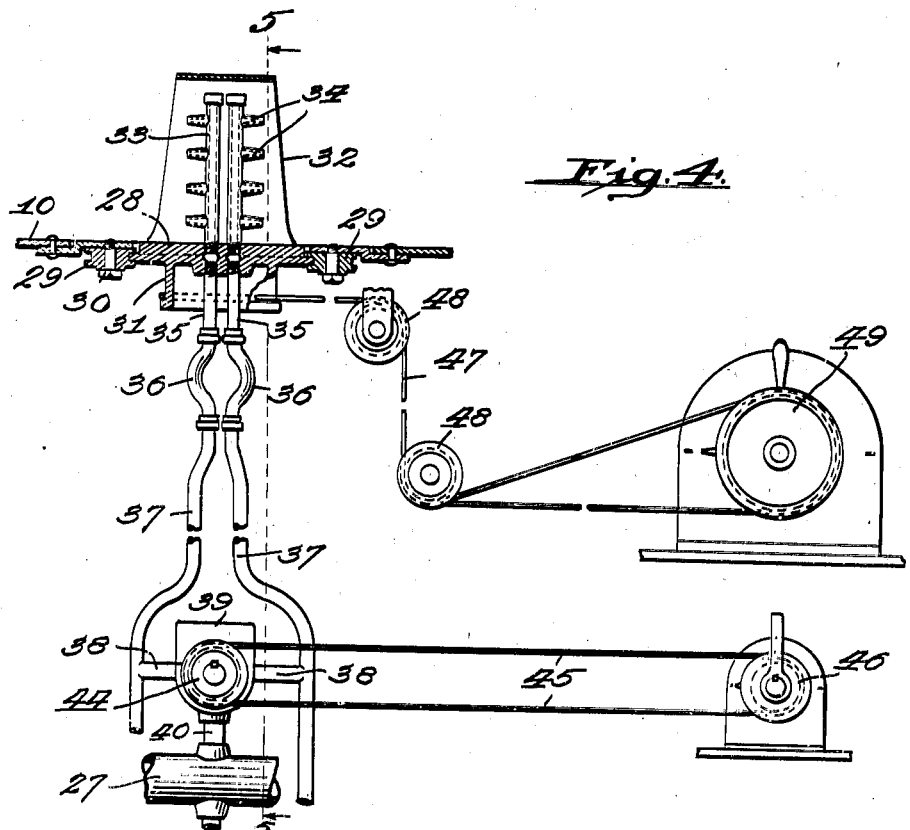
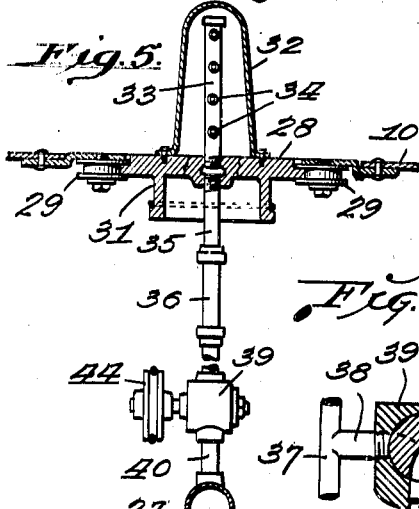
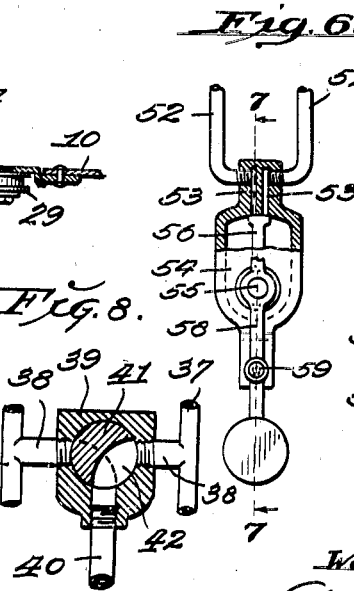
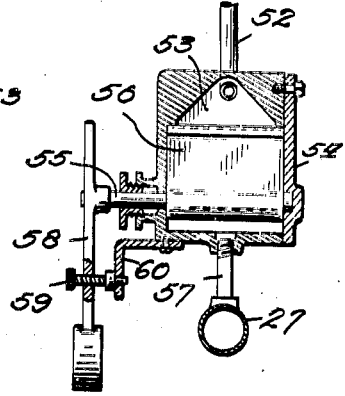
Inventor
Wellington B. Wheeler Patented Nov. 24, 1936

2,062,018

UNITED STATES PATENT OFFICE 2,062,018

DIRIGIBLE AIRCRAFT PROPULSION AND CONTROL

Wellington B. Wheeler, El Segundo, Calif., assignor of one-half to Florence E. Gaines, Los Angeles, Calif.

Application January 30, 1935, Serial No. 4,077

6 Claims. (Cl. 244—52)

My invention relates generally to dirigible aircraft and more particularly to the propulsion and control means therefor and my present invention is an improvement on U. S. Letters Patent No. 1,471,764 issued to my assignee, Florence E. Gaines and myself October 23, 1923; also U. S. Letters Patent No. 1,684,425, issued to me September 18, 1928.

The principal objects of my present invention are, to generally improve upon and simplify the construction of the aircraft disclosed in my aforesaid patents as well as other similar types of dirigible aircraft, further, to provide improved means for propelling the aircraft either forwardly, rearwardly or laterally and further, to provide relatively simple and practical means for effectively controlling the operation of the driving means.

Further objects of my invention are, to provide an aircraft of the character referred to with propulsion means that includes jet nozzles associated with the vanes or wings of the craft and which jet nozzles are utilized for the discharge of air at high velocity in order to propel the craft and which jet nozzles are capable of being turned into different positions so as to control the movement of the craft during flight, also while effecting a landing and to maintain the craft on an even keel while connected to an anchoring mast.

A further object of my invention is, to provide simple and efficient means for automatically compensating for the expansion and contraction of the gas that is utilized in the aircraft for imparting buoyancy thereto and which gas it will be understood expands to a considerable degree under rising temperatures and correspondingly contracts under lowering temperatures.

Further objects of my invention are, to provide a dirigible aircraft of the character referred to that is devoid of all revolving or rotating propellers and to arrange the jet nozzles so that the same may produce equalized thrust on the top, bottom and sides of the craft.

With the foregoing and other objects in view my invention consists in certain novel features of construction and arrangements of parts that will be hereinafter more fully described and claimed and illustrated in the accompanying drawings in which:

Fig. 1 is a vertical section taken lengthwise through the center of a dirigible aircraft of my improved construction.

Fig. 2 is a side elevational view of the craft.

Fig. 3 is a diagrammatic view of a construction that may be employed for automatically causing the craft to maintain a desired position when secured to a mooring mast or during flight.

Fig. 4 is an elevational view partly in section of one of the propulsion elements and showing the manual controls therefor.

Fig. 5 is a vertical cross section taken on the line 5—5 of Fig. 4.

Fig. 6 is an elevational view partly in section of an automatic control for the jet nozzles that constitutes the elevators for the craft.

Fig. 7 is a vertical section taken on the line 7—7 of Fig. 6.

Fig. 8 is a sectional view taken through the center of one of the valves that are used for controlling the operation of the jet nozzles.

As illustrated in Figs. 1 and 2, the body of my improved craft is of elongated egg shape, preferably pointed at both front and rear and said body includes a shell 10 of sheet metal, preferably duralumin or other like metal.

Arranged at or near the longitudinal center of the body is a bulkhead 11 and located a suitable distance forward from this bulkhead is a second bulkhead 12.

Located near the rear end of the body 10, is a bulkhead 13.

The chamber 14 in front of bulkhead 12 and the chamber 15 between the bulkheads 11 and 13 constitute containers for gas that provide the necessary buoyancy for the craft.

Formed within the nose of the craft is a navigator's cabin 16 and leading therefrom to the chamber 17 between the bulkheads 11 and 12, is a tunnel 18.

The chamber 17 between the bulkheads 11 and 12 contains the air compressors and other operating parts of the craft and said chamber may also be arranged for the accommodation of passengers and crew and for the storage of supplies, freight and the like.

Secured to bulkheads 11 and 13 and leading from chamber 17 to the chamber 19 to the rear of bulkhead 13, is a tunnel 20.

Arranged within the chambers 14 and 15 to the sides of the tunnels 18 and 20, are vertically disposed tubular members 21, the lower ends of which are open to the atmosphere. Arranged for sliding movement in each tubular member, is a piston 22 and connected to the top of each piston are two or more cables 23. These cables extend upward through the tubes and pass over pulleys 24 that are mounted on the upper ends of said tubes and from said pulleys the cables pass downward and are connected to counter-balancing weights 25, preferably rings that surround and slide upon the tubes 21.

The construction just described provides simple and efficient means for compensating for the expansion and contraction of the gas that fills the chambers 14 and 15.

As the temperature surrounding the aircraft rises, the gas within the chambers 14 and 15 expands, thereby moving the pistons 23 downward through the tubes 21 and as the temperature lowers and the gas contracts, the pistons 22 will move upward within the tubes 21 and which upward movement is brought about by the counterbalancing weights 25.

Suitably arranged in the lower portion of chamber 17 is a series of air compressors 26 that may be driven in any suitable manner, preferably by an internal combustion engine or engines (not shown), and connected to these compressors is a compressed air manifold 27.

Four of the multiple propulsion jets that are utilized for propelling the craft are located in that portion of the wall that surrounds chamber 17, one of said jets being located at the top of the body of the ship, another jet being located at the bottom of the body and two jets located in the side wall approximately ninety degrees from the top and bottom jets. These jets, which are illustrated in detail in Figs. 4 and 5, are duplicates of each other and therefore but one jet will be described in detail.

Each jet support comprises a disc-shaped plate 28 that occupies a corresponding opening formed in the wall of the body and the edge of each plate is positioned between the flanges of rollers 29. Each roller is mounted for rotation on a screw or bolt 30 that is removably seated in the wall of the body and thus by removing two or more of the screws and the rollers carried thereby, it is possible to remove the supported plate 28 and draw the same into the compartment 17 in the event that repairs or adjustments are required.

Formed integral with the inner face of each plate 28 is a drum 31 upon which is adapted to wind a cable and which latter, when manipulated, imparts rotary movement to the plate.

Carried by and projecting outwardly from each plate 28, is a vane that comprises a hood 32 open at opposite sides and which functions as a housing for the multiple jet nozzles that project outward from the center of the plate.

Seated in the center of each plate 28 and arranged side by side and projecting outwardly in the center of each hood 32, is a pair of tubes 33, the outer ends of which are closed, and projecting outwardly from each tube toward the adjacent open side of the hood, is a plurality of jet nozzles 34. Thus the jet nozzles of one tube project in the opposite direction from the jet nozzles carried by the other tube.

Seated in and projecting inwardly from each plate 28, is a pair of tubes 35, the inner ends of which communicate with the open inner ends of the tubes 33 and connected to these tubes 35, are short flexible tubes 36 that permit the plates to be turned through an arc of approximately 90°.

The flexible tubes 36 that are connected to the plate 28 at the top of the craft are connected respectively to the flexible tubes 36 that are associated with the plate 28 at the bottom of the craft by tubes 37 that extend through the chamber 17 and in a similar manner, the flexible tubes associated with the plates 28 on the sides of the craft are connected by tubes 37.

Branch pipes 38 connect the members of each pair of tubes 37 with a valve housing 39, the latter being located adjacent to manifold 27 and the chamber within each valve housing is connected to the manifold by a short pipe 40.

Arranged for operation in each valve housing, is a valve 41 having a port 42 that is adapted to establish communication between pipe 40 and either one of the branch pipes 28 (see Fig. 8).

The valves 41 may be manually operated by means of handles 43 that are mounted on the stems of the valves 41 as illustrated in Fig. 1 or as illustrated in Fig. 4, the stem of each valve may carry a pulley 44 around which passes a cable 45 and the latter also passing around a manually operable drum 46 that is located in the navigator's cabin.

The means utilized for rotating the plates 28 through arcs of approximately 90° includes cables 47 that pass around suitably located pulley 48 and around a manually operable drum or wheel 49 that is located in the navigator's cabin.

Mounted for rotation in the top and bottom walls of the craft structure above and below the rear chamber 19, are plates 28$^a$ that are identical in construction with plates 28 and each plate carries a pair of the tubes 33 and jet nozzles 34, also a drum 30, around which passes operating cables 47$^a$ similar to the cables 47 and which cables 47$^a$ lead to an operating wheel located in the navigator's cabin.

The jet nozzle carrying tubes that are mounted on the plates 28$^a$ are connected by flexible tubes 36$^a$ identical with the tubes 36 and by tubes 37$^a$ that are practically identical with tubes 37 and leading from said tubes 37$^a$ through the tunnel 20 to the opposite sides of a valve housing 39$^a$ that is identical with valve housing 39, are tubes 50.

Valve 39$^a$ is practically identical in construction with valve 39 and when operated delivers compressed air from manifold 27 into one or the other of tubes 50 that lead to the tubular connections between plates 28$^a$ and the jet nozzles carried thereby.

Plates 28$^a$ carry hoods 32$^a$ open on opposite sides and practically identical with hoods 32.

Mounted for rotation upon rollers 29$^a$ in the side walls of the craft at the sides of chamber 19, are plates 28$^b$ identical with plates 28 and each plate carrying a pair of the jet nozzles that occupy laterally projecting hoods 32$^b$ that are identical with hoods 32.

These hoods and the jet nozzles positioned therein, in addition to serving as propulsion elements, function as elevators to raise or lower the rear portion of the craft and the nozzle carrying tubes that project outwardly from said plates are connected by tubular members 51 that are composed of members identical with the tubes 35, 36 and 37.

Each one of these cross tubes is connected by tubes 52 that extend through tunnel 20 to the chamber 17 and the ends of said tubes within said chamber are connected respectively to ports 53 that are formed in the upper portion of a valve housing 54.

Extending through the lower portion of this valve housing is a shaft 55 and positioned thereon within the housing, is a plate 56, the upper end of which is adapted to close the lower ends of both ports 53 or to open either one of said ports depending upon the position assumed by said plate 56 relative to a vertical plane.

The lower portion of the chamber within valve housing 54, in which swinging plate 56 is positioned, is connected by a tube 57 to the manifold 27.

Shaft 55 which carries plate 56, extends through one side of the valve housing 54 and mounted on said extended end is pendulum arm 58. Seated in the lower portion of the pendulum arm, is a screw 59, the point of which is adapted to enter an aperture formed in a bracket 60 that is supported on the valve housing and when the point of the screw is engaged in the aperture in this bracket the pendulum is supported in a vertical position with the upper end thereof closing the lower ends of ports 53, as illustrated in Fig. 6.

The construction illustrated in Fig. 3 is utilized for automatically maintaining the ship in a definite position when anchored to a mooring mast or during flight, and this structure includes a compass 61 that occupies a fixed position on the craft. Carried by the needle 62 of the compass, is a ring 63, from which projects fingers 64 that are spaced equidistant apart and as illustrated there are preferably eight of these fingers or if desired the number of fingers may be increased.

Surrounding the compass is a concentric ring 65, on which is adjustably mounted a block 66 of insulating material and projecting from the ends of said block are spaced contact fingers 67.

Ring 65 is fixed on the craft.

The block 66 is provided with suitable means whereby it may be secured to ring 65 in differently adjusted positions.

This automatic arrangement is associated with the valve 39ª that controls the flow of compressed air through pipes 50 that lead to the jet nozzles carried by the plate 28ª above and below compartment 19 at the stern of the craft.

Secured to the stem of valve 39ª is an arm 68, the free end of which is slotted for the reception of a pin that is carried by a solenoid core 69. The ends of this core are positioned in coils 70 located on opposite sides of arm 68 and connecting these coils with contact fingers 67, are conductors 71.

Coils 70 are also connected by a conductor 72 to the ring 63 that is carried by the compass needle 62 and located in this conductor is a source of electrical energy, preferably a battery 73.

During forward flight of the aircraft, the navigator manipulates the various cables that operate on the drums that are carried by the inner faces of the plates that carry the jet nozzles, so that the various hoods on the top, bottom and sides of the ship are longitudinally disposed, that is, the openings in said hoods are presented fore and aft with the various jet nozzles projecting forwardly and rearwardly toward the open ends of said hoods.

The valves that control the flow of compressed air from manifold 27 to the pipes leading to the various jet nozzles are now manipulated so as to permit compressed air to pass through to the pipes that lead to the rear jet nozzles of each pair.

As compressed air discharges from the rearwardly presented sets of jet nozzles through the openings at the rear sides of the hoods arranged over said jet nozzles, reactive pressure is developed that will propel the craft forwardly and at the same time a relatively high degree of suction of air will be produced through the hoods to assist the reactive pressure in propelling the craft forwardly.

In the event that it is desired to move laterally in either direction during forward flight, the nozzle carrying plates 28 and 28ª at the top and bottom of the craft may be slightly shifted by operation of the proper cables that lead to the drums on said plates and thus the angular positions of the hoods and the jet nozzles associated therewith will be changed so as to cause the ship to move in the corresponding lateral direction simultaneous with its forward movement.

In the event that it is desired to cause the ship to move upwardly or downwardly during forward flight, the plates 28ᵇ, located in the side walls of the craft to the sides of chamber 19 may be partially rotated in the proper direction, thereby correspondingly changing the angular positions of the hoods and jet nozzles carried by said plates so that the jets of air discharged rearwardly through the hoods will exert reactive pressure to elevate or depress the rear portion of the craft, thereby causing the same to either ascend or descend simultaneously with its forward flight. In accomplishing this function the hoods and jet nozzles carried by the plates 28ᵇ function as elevators.

This upward or downward movement of the craft while in forward flight may be increased by proper manipulation of the plates located in the side walls of the craft to the sides of chamber 17 and proper manipulation of the valve that controls the flow of compressed air to the jet nozzles carried by said plates.

Obviously by manipulating the compressed air control valves so as to discharge air from the forwardly presented jets within the various hoods, the craft may be caused to travel in a rearward direction.

Where the craft is anchored to a mooring mast or during loading and unloading operations and it is desired to maintain the craft on an even keel, the plates 28 are rotated so that the hoods carried by said plates occupy vertical positions, that is, with the openings in said hoods disposed in vertical alignment.

Screw 59 is disengaged from bracket 60 and as long as the craft is on an even keel the pendulum 58 occupying a vertical position, will close both ports 53.

Should the rear portion of the ship raise or lower, the pendulum 58 will remain in a true vertical position, thereby holding plate 56 in vertical position and as the valve housing 54 moves with the ship, one of the ports 52 will be uncovered so as to permit compressed air to pass through the corresponding one of the pipes 52 and discharge through the corresponding set of jet nozzles.

If the rear portion of the craft tends to raise, compressed air will be discharged from the upper set of jet nozzles carried by plate 28, so as to bring about reactive forces to cause the rear portion of the ship to lower, or if air is permitted to discharge from the lower set of jet nozzles then the rear portion of the craft will be raised until said craft is on an even keel, at which time the upper end of plate 56 will close both ports 53 so as to cut off the flow of compressed air to the jet nozzles.

When the craft is anchored to a mooring mast and it is desired to maintain the craft in a definite position radially with respect to said mast, the plates 28ª carrying hoods 32ª are rotated so that the jet nozzles beneath said hoods are transversely disposed with respect to the axis of the craft in order that the compressed air when discharged will flow outwardly at right angles to the axis of the craft.

The block 66 carrying contact fingers 67 is adjusted on ring 65 so as to correspond with the radial position in which the craft is to be held and said contact fingers 67 are disposed on opposite sides of one of the fingers 64 that project from ring 63 carried by the compass needle.

As long as the ship maintains a fixed radial position, the contact fingers 67 will not contact with one of the fingers 64 on ring 63, but should the ship shift laterally, substantial distance in either direction, one of the fingers 67 will contact with the fingers 64 positioned between said finger 67, thereby energizing circuit 72 and one of the coils 70 so that core 69 is drawn into the energized coil, thereby shifting valve 39ª so as to permit compressed air to pass through one of the pipes 60 and to discharge from one set of the jet nozzles carried by plates 28ª.

Such action produces reactive forces to return the ship to its original radial position and as the circuit 72 is broken, valve 39ª will be restored to its neutral position until subsequently actuated as a result of the craft moving to one side or the other of the desired radial position.

Thus it will be seen that I have provided a dirigible aircraft propulsion and control that is relatively simple in construction and which is very effective in performing its intended functions.

The units comprising the rotating plates carrying the hoods and jet nozzles may be advantageously employed on the wings of aircraft and practically the same structure may be utilized on submarine vessels for their propulsion and control.

The jet nozzles covered by the hoods, the latter being open on opposite ends, provide relatively simple and useful means for producing propulsion forces and this propelling means is capable of being conveniently manipulated so as to drive and maneuver the craft with exceptional facility.

It will be understood that minor changes in the size, form and construction of the various parts of my improved dirigible aircraft propulsion control may be made and substituted for those herein shown and described without departing from the spirit of my invention, the scope of which is set forth in the appended claims.

I claim as my invention:

1. In a dirigible aircraft propulsion and control, a body, plates rotatably mounted in the upper and lower portions of the walls of said body, plates mounted for rotation in the side walls of the body, a hood carried by and projecting outwardly from each plate, each hood being provided with oppositely arranged openings, jet nozzles carried by said plates and arranged to discharge jets of fluid pressure outwardly through the openings in said hoods, manually operable means for rotating said plates, means within the craft for supplying fluid pressure to said jet nozzles, manually operable means for controlling the flow of fluid pressure to certain of said jet nozzles and automatically operating means for controlling the flow of fluid pressure to other of said jet nozzles.

2. In a dirigible aircraft propulsion and control, a body, a plate, means for supporting said plate for rotation on the wall of the body, which supporting means is removable to permit the plate to be drawn into the body, a hood carried by and projecting outwardly from said plate, which hood is provided on opposite sides with openings, a pair of tubes carried by said plate beneath said hood and jet nozzles projecting from each tube toward the adjacent opening in said hood.

3. In a dirigible aircraft propulsion and control, a body, a plate, means for supporting said plate for rotation on the wall of the body, which supporting means is removable to permit the plate to be drawn into the body, a hood carried by and projecting outwardly from said plate, which hood is provided on opposite sides with openings, a pair of tubes carried by said plate beneath said hood, jet nozzles projecting from each tube toward the adjacent opening in said hood and means for rotating said plate on its supporting means.

4. In a dirigible aircraft propulsion and control, a body, a plate, means for supporting said plate for rotation on the wall of the body, which supporting means is removable to permit the plate to be drawn into the body, a hood carried by and projecting outwardly from said plate, which hood is provided on opposite sides with openings, a pair of tubes carried by said plate beneath said hood, jet nozzles projecting from each tube toward the adjacent opening in said hood, means for rotating said plate on its supporting means and means for supplying said tubes with fluid pressure.

5. In a dirigible aircraft propulsion and control, a body, a plate, means for supporting said plate for rotation on the wall of the body, which supporting means is removable to permit the plate to be drawn into the body, a hood carried by and projecting outwardly from said plate, which hood is provided on opposite sides with openings, a pair of tubes carried by said plate beneath said hood, jet nozzles projecting from each tube toward the adjacent opening in said hood, means for rotating said plate on its supporting means, means for supplying said tubes with fluid pressure and means for controlling the flow of fluid pressure through said supplying means.

6. In a dirigible aircraft propulsion and control, a body, a plate, means for supporting said plate for rotation on the wall of the body, which supporting means is removable to permit the plate to be drawn into the body, a hood carried by and projecting outwardly from said plate, which hood is provided on opposite sides with openings, a pair of tubes carried by said plate beneath said hood, jet nozzles projecting from each tube toward the adjacent opening in said hood, means for rotating said plate on its supporting means and means within the body for compressing fluid and delivering same to the tubes carried by said plate.

WELLINGTON B. WHEELER.